(12) United States Patent
Robinson

(10) Patent No.: US 6,655,637 B1
(45) Date of Patent: Dec. 2, 2003

(54) SPACECRAFT FOR REMOVAL OF SPACE ORBITAL DEBRIS

(75) Inventor: Ernie Y. Robinson, Altadena, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/179,788

(22) Filed: Jun. 24, 2002

(51) Int. Cl.[7] ................................................. B64C 1/62
(52) U.S. Cl. .................... 244/161; 244/158 R; 244/163
(58) Field of Search ............................ 244/158 R, 161, 244/163, 159; 414/729

(56) References Cited

U.S. PATENT DOCUMENTS

| | | | | |
|---|---|---|---|---|
| 2,996,212 A | * | 8/1961 | O'Sullivan | ............... 244/158 R |
| 3,268,091 A | * | 8/1966 | Melton | |
| 3,601,442 A | * | 8/1971 | Orndorff | |
| 4,260,187 A | * | 4/1981 | Frosch et al. | ................ 244/161 |
| 4,718,709 A | * | 1/1988 | Myers et al. | |
| 4,750,692 A | * | 6/1988 | Howard | ................... 244/158 R |
| 4,991,799 A | * | 2/1991 | Petro | ....................... 244/158 R |
| 5,116,093 A | * | 5/1992 | Burns | |
| 5,279,482 A | * | 1/1994 | Dzenitis et al. | .............. 244/161 |
| 5,401,069 A | * | 3/1995 | Swan | |
| 5,405,108 A | * | 4/1995 | Marin et al. | ............. 244/158 R |
| 5,421,540 A | * | 6/1995 | Ting | ............................. 244/163 |
| 5,511,748 A | * | 4/1996 | Scott | ........................... 244/161 |
| 6,119,983 A | * | 9/2000 | Provitola | ................. 244/158 R |
| 6,439,508 B1 | * | 8/2002 | Taylor | ......................... 244/159 |

\* cited by examiner

*Primary Examiner*—Michael J. Carone
*Assistant Examiner*—L. Semunegus
(74) *Attorney, Agent, or Firm*—Derrick Michael Reid

(57) ABSTRACT

A deorbiting spacecraft includes a grabber for grabbing an orbiting debris object in space and a deorbitor for deorbiting the debris object. The grabber includes inflatable fingers with loop eyes for bending inflated fingers around and to grab the space debris object using controlled motors and tension lines. The deorbitor is a dragsphere for deorbiting low earth orbit debris objects into the atmosphere for burn up, or is a surface for collecting solar wind for pushing the debris into an outer disposal orbit, or is a thruster for transorbiting a high earth orbit debris object to an outer waste orbit.

12 Claims, 3 Drawing Sheets

GRABBING DEORBITING SPACECRAFT

APPROACHING DEORBITING SPACECRAFT

CONTACTING DEORBITING SPACECRAFT

INFLATED DEORBITING SPACECRAFT

GRABBING DEORBITING SPACECRAFT

DRAGSPHERE

GRABBING DRAGSPHERE
DEORBITING SPACECRAFT

BENT FINGERS
DEORBITING DEBRIS

TIME OF ENTRY (YEARS)

12 kg 3 kg

ONE METER DRAGSPHERE
REMOVAL GRAPH

ORBIT ALTITUDE - km

SPACECRAFT FOR REMOVAL OF SPACE ORBITAL DEBRIS

FIELD OF THE INVENTION

The invention relates to the field of spacecraft design and space debris removal system. More particularly, the present invention relates to a dragsphere for removing orbital space debris.

BACKGROUND OF THE INVENTION

Over the past several decades, many systems have been launched into orbit about the earth. Some of these systems, including large spacecraft, have long passed useful operating lives and have effectively become space debris. Defense surveillance program have deployed satellites in high geosynchronized orbits. The deployed satellites have operational fuel for maintaining the satellite in the geosynchronized orbit and reserve fuel to deorbit a spacecraft after operational usefulness into an outer supersynchronized burial or disposal orbit. The spacecraft could have extended life for orbit maintenance if the reserve fuel could be used for orbit adjustment.

Currently, designs for microsatellites and picosatellites promise the deployment of many small orbiting satellites that would further congest space orbits providing an ever increasing need to remove from orbit space debris. Other types of waste debris, such as jettison hardware waste, have also been collecting in orbit about the earth. These objects may travel at extremely high speeds representing serious threats to operating spacecraft in orbit. Over time, gravity can affect the orbits of space debris causing ever shifting orbits presenting a compounding threat and need for elaborate collision avoidance methods. Presently, there are thousands of space debris objects being tracked so that planners can place a new system in an unobstructed orbit or that operators can maneuver space systems to avoid collision with space debris objects. Presently, there are no realistic means available to remove debris by deorbiting or transorbiting a piece of orbiting debris. As such, there exists a serious threat to existing operating spacecraft, which threat is continually increasing. Confronted with an every increasing risk of collision, some system planners have proposed attaching a sacrificial propulsion system that then thrusts the debris out of an existing orbit to either deorbit the debris into the atmosphere where the debris deorbits from a low earth orbit into the atmosphere and burns up, or transorbit the debris from high earth orbit to an outer waste orbit by thrusting the debris to the outer waste orbit. Such proposed space debris attaching systems have autonomous navigation, ranging, thrusting, and close in navigation capabilities. However, such proposed systems do not have suitable means for attaching and deorbiting the space debris. These and other disadvantages are solved or reduced using the invention.

SUMMARY OF THE INVENTION

An object of the invention is to provide a system for removing space debris.

Another object of the invention is to provide a system for removing space debris from a low earth orbit into the atmosphere.

Yet another object of the invention is to provide a system for removing space debris from a high earth orbit into an outer waste orbit.

Still another object of the invention is to provide a system for removing space debris using an inflatable controlled grabber for grabbing the debris.

A further object of the invention is to provide a system for removing space debris using an inflatable controlled grabber for grabbing the debris and using a deorbiting means for deorbiting or transorbiting the debris.

The invention is directed to a deorbiting spacecraft for the removal of space debris. The deorbiting spacecraft includes conventional components such as having ranging sensors, navigation processors and propulsion systems. The preferred form is directed to a single deorbiting spacecraft, but multiple like spacecraft could be bundled together for deploying a plurality of like spacecraft when several debris objects are to be deorbited. The deorbiting spacecraft includes a deployable grabber and a deorbiting means referred to as a deorbitor. In the preferred form, the deployable grabber is an inflatable grabber, and the deorbiting means is a dragsphere for removing debris from a low earth orbit into the atmosphere where the debris eventually burns up, or the deorbitor includes a thruster for thrusting the debris out of a high earth orbit into an outer waste orbit. In another form, the dragsphere is propelled by the solar wind pushing upon the dragsphere so as to transorbit the debris from a high earth orbit to an outer disposal orbit.

The deorbiting spacecraft inflatable grabber has deployable inflatable fingers with a tensioning mechanism for gripping the debris. The inflatable fingers are inflated to extend from the deorbiting spacecraft in a plurality of respective directions. After inflation when the deorbitor has made a close approach to the debris, the inflatable fingers are then retracted by articulated flexing so as to grab the debris object. In the preferred form, the tensioning mechanism is a mix of motors and tension lines extending through loop eyes along the extending inflated fingers, so that, the motors are controlled to pull and release the tension lines in a controlled manner, to bend the inflatable flexible fingers to surround and grab the debris object. After grabbing, the deorbiting spacecraft then deorbits the debris using the deorbitor. The deorbitor is preferably a fuel efficient inflatable dragsphere used for atmospheric dragging and deorbiting low earth orbit debris into the atmosphere or dragging and deorbiting by solar wind forces high earth orbit debris into the outer supersynch disposal orbit disposal orbits, or is preferably a thruster for thrusting and transorbiting the debris from the high earth orbit to the outer disposal orbit. The dragsphere is a deployable high drag device such as a balloon or rigidizable sphere. This dragsphere enables deorbiting the debris by a simple mechanism instead of attaching a propulsion and guidance system to forcefully deorbit by large thrust in a short period of time. These and other advantages will become more apparent from the following detailed description of the preferred embodiment.

DETAILED DESCRIPTION OF THE PREFERRED EMBODIMENT

Figure 1:
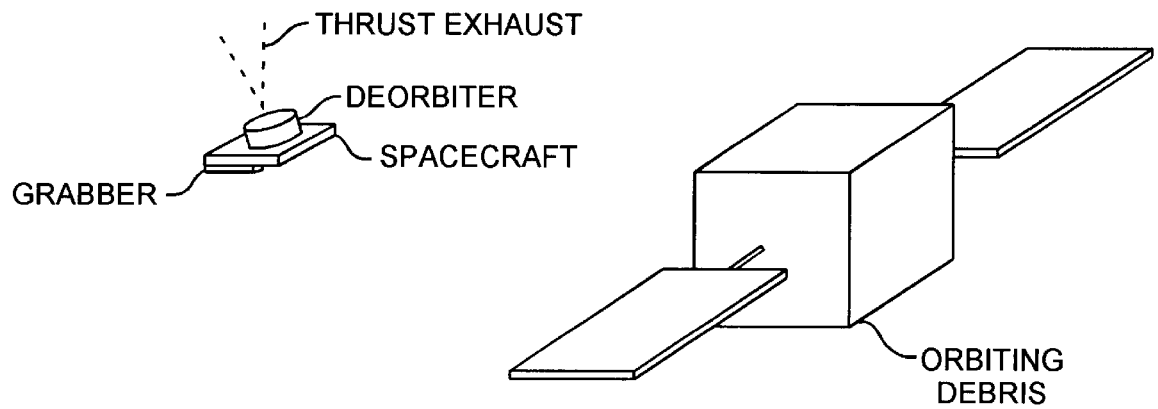
FIG. 1 is a diagram of an approaching deorbiting spacecraft.
Figure 2:
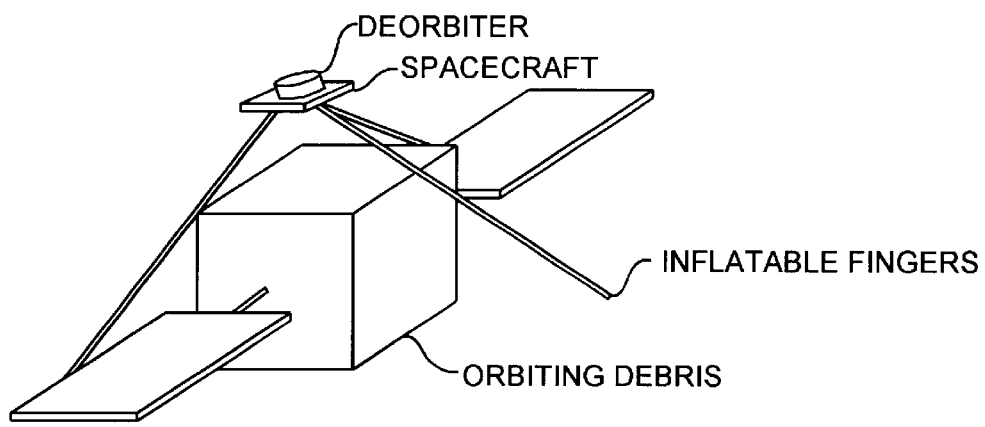
FIG. 2 is a diagram of a contacting deorbiting spacecraft.
Figure 3:
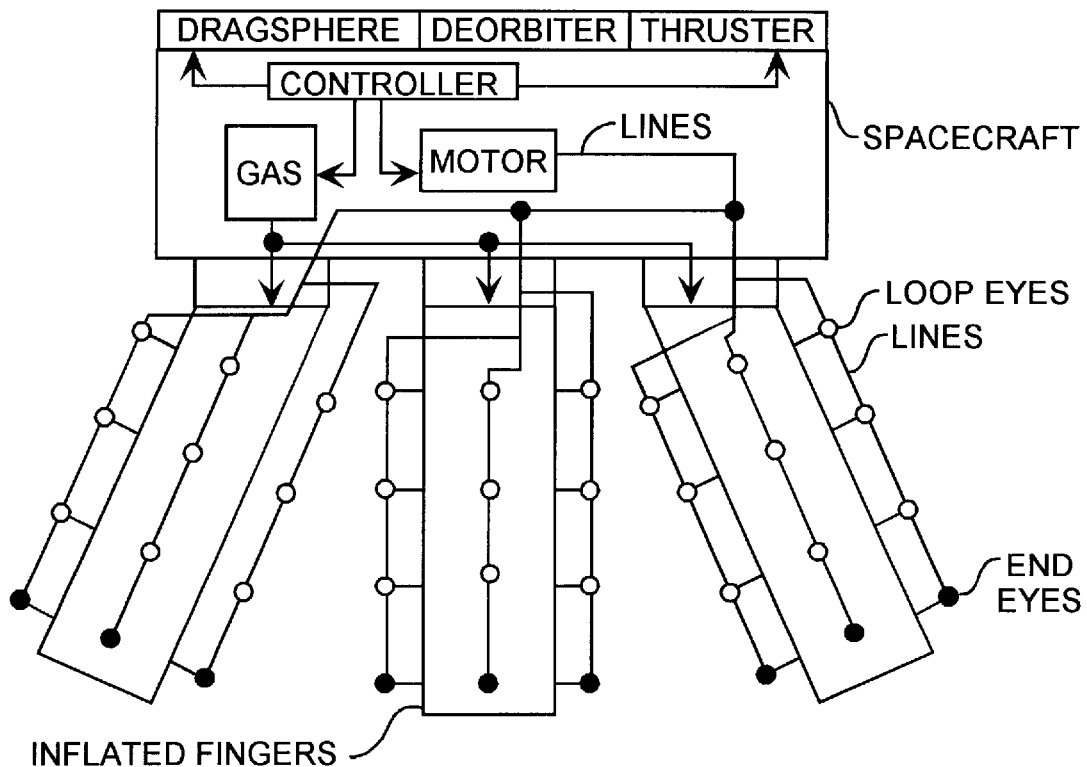
FIG. 3 is a diagram of an inflated deorbiting spacecraft.
Figure 4:
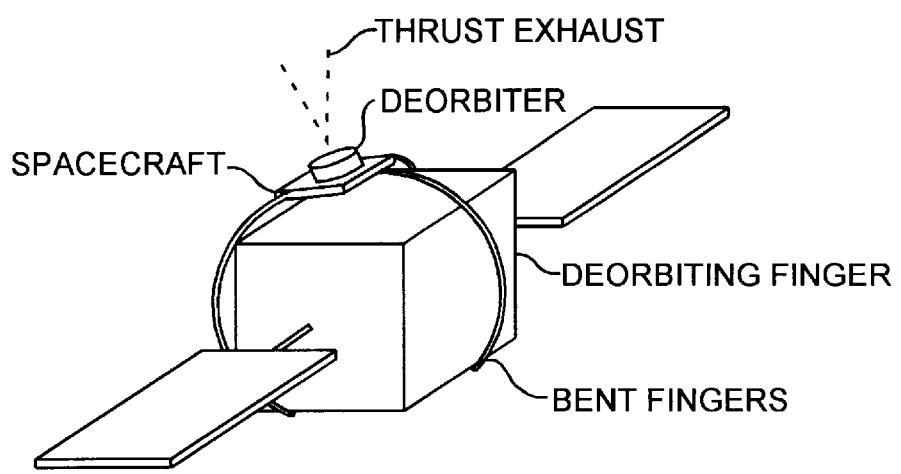
FIG. 4 is a diagram of a grabbing deorbiting spacecraft
Figure 5:
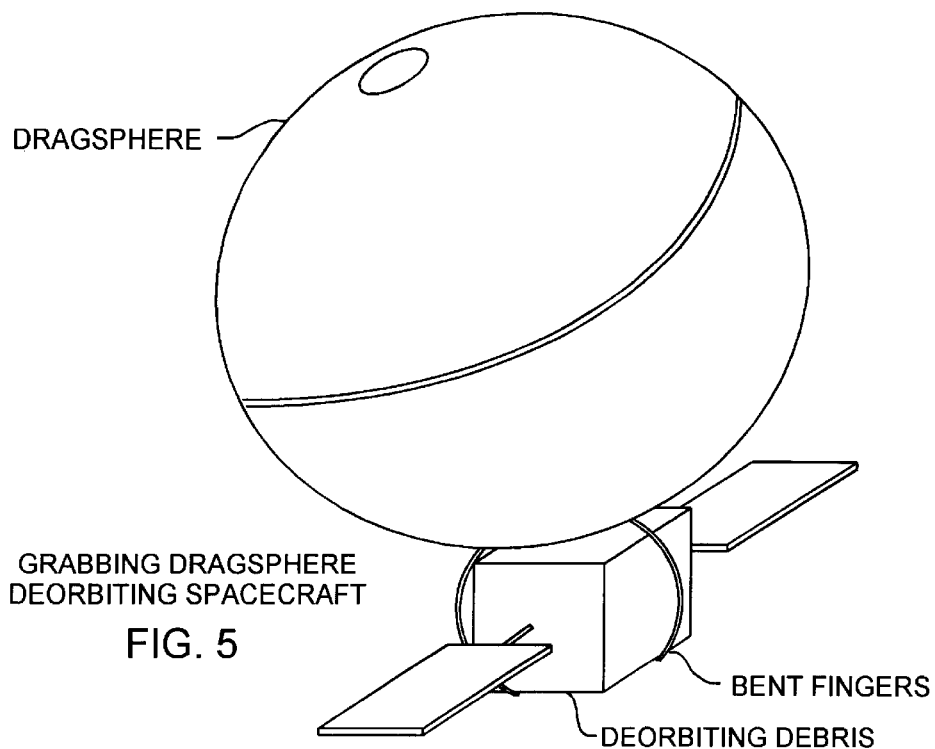
FIG. 5 is a diagram of a grabbing dragsphere deorbiting spacecraft.
Figure 6:
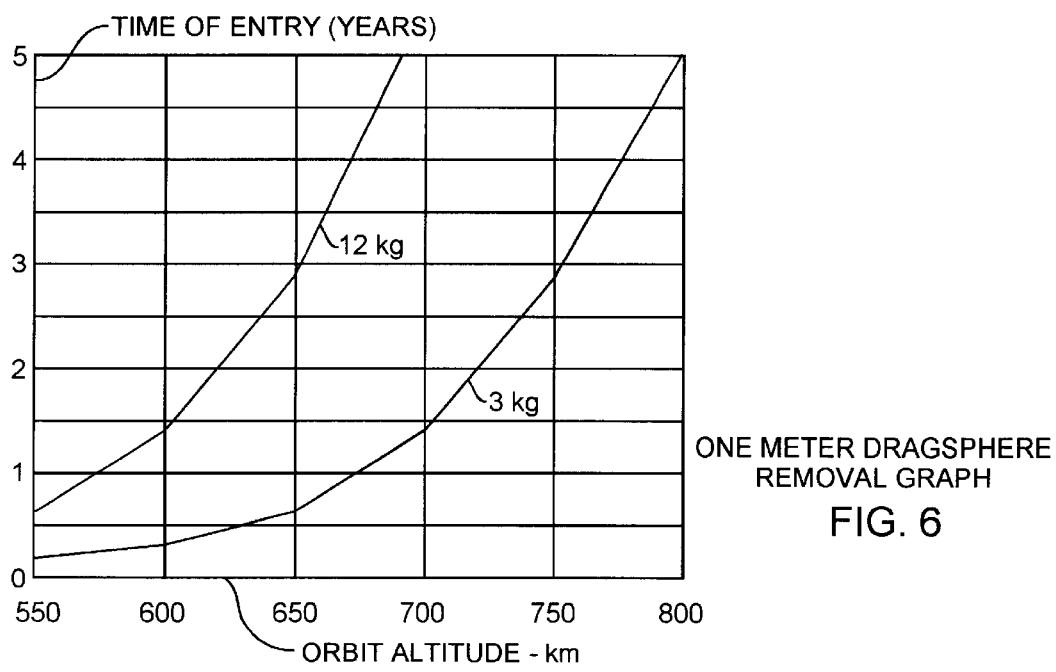
FIG. 6 is a graph of the removal time for a one-meter dragsphere.

An embodiment of the invention is described with reference to the figures using reference designations as shown in the figures. Referring to all of the figures, a deorbiting spacecraft, that may be a microsatellite or a carrier vehicle, uses conventional controls, microthrusting, ranging and navigation to approach a piece of orbiting debris, that may be for example, an inoperative satellite. The deorbiting spacecraft is placed in the vicinity of the selected debris and acquires the debris using ranging methods, for example a machine vision system, or optical ranging or radar. When the deorbiting spacecraft is in close range, the fingers are extended by inflation. The inflation can be achieved using several means, such as gas canisters, sublimation powders, and microelectromechanical gas generators. The gas supply can be a nitrogen gas supply. In the case of gas canisters, a controller commands the release of gas to inflate the fingers that then extend outwardly to surround and embrace the debris object.

The deorbiting spacecraft preferably includes three deployable inflatable fingers, like fishing poles, that have several sets of tendon tension lines, similar to fishing pole lines that are released, unwind and wind to bend the fingers around the debris object by reaching out over a large enough volume to surround and embrace the debris. The tension lines are fed from the motor through loop eyes disposed along the length of the fingers to end eyes at distal ends of the fingers. By controlled tensioning of the lines, the fingers bend and function to grasp and hold on to the debris object.

When within a close range, for example from one to ten meters, the grasping fingers are inflatably deployed. The fingers are sized and arranged to surround the selected debris object, for example the fingers can be thirty meters long and oriented at about 120° angles. When the debris is within reach, the motor mechanism will pull on and tighten the tendon lines causing the fingers to wrap around the debris object and secure the object.

The deorbitor can be a thruster or a dragsphere. A thruster deorbiting spacecraft is preferably used to deorbit a high earth altitude debris object into an outer waste orbits. A dragsphere deorbitor is preferably used to deorbit a low earth orbit debris object using atmospheric drag forces. The dragsphere deploys from a stowed flat configuration to a spherical configuration like a balloon. The balloon can be made of rubber or nylon. The dragsphere can a rigidized sphere but lack efficient stowage volume. The dragsphere can be in the form of other deployable large-area drag devices having drag surfaces, for example, an expanding umbrella shape, but may require additional attitude control for efficient alignment to expected atmospheric drag forces. The dragsphere is preferably an inflatable balloon from one to several meters in diameter. The added drag causes the debris object to reenter the atmosphere and burn up. FIG. 7 is a chart showing the time to deorbit debris of three kilograms and twelve kilograms with a one- meter balloon dragsphere. The time to deorbit can be greatly reduced with larger diameter dragspheres. The dragsphere balloon increases drag forces on the debris at any attitude, resulting in accelerated deorbiting and burn up during atmospheric reentry. Preferably, the deorbiting spacecraft is a single dragsphere or trusting deorbitor in a single disposable package. The deorbiting spacecraft can be a carrier microsatellite that repeats the grabbing and deorbiting process with additional detachable dragsphere and grabber picospacecraft for deorbiting several other pieces of debris.

The present invention covers approach maneuvering, grabbing and deorbiting functions in a preferred configuration. In other configurations, a carrier vehicle, not shown, may contain several microsatellites deorbiting spacecraft, each of which is attached, in turn, to the selected debris object. The carrier vehicle may include propulsion necessary for the approach of the debris object so as to enable inflatable fingers to grab the debris object and then enable inflation of a dragsphere to deorbit the object. The carrier spacecraft separates from the dragsphere and moves away, leaving the dragsphere attached to the debris object. Hence, the carrier vehicle is used to approach and deliver the grabber and deorbitor to the object and as such needs only one propulsion system for the approach, but has several detachable grabbers and deorbitors for removing several objects in one carrier mission. As such, the carrier vehicle functions as a roving space-based waste removal system. Those skilled in the art can make enhancements, improvements, and modifications to the invention, and these enhancements, improvements, and modifications may nonetheless fall within the spirit and scope of the following claims.

What is claimed is:

1. A system for removing an object from an orbit, the system comprising, a thruster for moving the system towards the object, a grabber for grabbing the object as a grabbed object, the grabber comprising:

a plurality of inflatable fingers;

a gas supply for inflating the inflatable fingers;

mechanical motors for controlling the grabber to grab the object; and tension lines connecting the motors to the inflatable fingers for bending the inflatable fingers for grabbing the object, and a deorbitor for removing the grabbed object from the orbit.

2. The system of claim 1 wherein the grabber further comprises, loop eyes attached to the fingers for routing the tension lines along the fingers for controlling the grabbing of the fingers.

3. The system of claim 1 wherein the deorbitor is a thruster.

4. The system of claim 1 wherein, the orbit is a high attitude orbit, and the deorbitor is a thruster for removing the object from the high altitude orbit to an disposal orbit.

5. The system of claim 1 wherein the deorbitor is a dragsphere.

6. The system of claim 1 wherein the deorbitor is an inflatable dragsphere containing a sublimation powder for inflating the dragsphere in space.

7. The system of claim 1 wherein the deorbitor comprises, an inflatable dragsphere, and a gas supply for inflating the dragsphere, the dragsphere being an inflatable balloon.

8. The system of claim 1 wherein the orbit is a low earth orbit, the deorbitor is a dragsphere for removing the object from the low earth orbit into atmosphere of earth, the atmosphere applying pressure upon the dragsphere to deorbit the object.

9. The system of claim 1 wherein the orbit is a high earth orbit, the deorbitor is a dragsphere for removing the object from the low earth orbit into an outer disposal orbit with solar wind applying pressure upon the dragsphere to deorbit the object.

10. The system of claim 1 wherein the orbit is a high earth orbit, the deorbitor comprises a surface for receiving solar wind pressure for removing the object from the high earth orbit into an outer disposal orbit to deorbit the object.

11. A system for grabbing an object in space, the system comprising, a thruster for moving the system towards the object, a grabber for grabbing the object as a grabbed object, the grabber comprising:

a plurality of inflatable fingers;

a gas supply for inflating the inflatable fingers; mechanical motors for controlling the grabber to grab the object; and tension lines connecting the motors to the inflatable fingers for bending the inflatable fingers for grabbing the object.

12. The system for grabbing an object in space, the grabber comprising, a plurality of inflatable fingers, a gas supply for inflating the inflatable fingers, mechanical motors form controlling the grabber to grab the object, tension lines connecting the motors to the inflatable fingers for bending the inflatable fingers for grabbing the object, and loop eyes attached to the fingers for routing the tension lines along the fingers for controlling the grabbing of the fingers.

\* \* \* \* \*